March 13, 1934. J. J. MacKAY 1,950,501
ROCK CRUSHING PLANT
Filed May 16, 1931    9 Sheets-Sheet 1

Inventor:
John J. MacKay.
By Whiteley and Ruckman
Attorneys

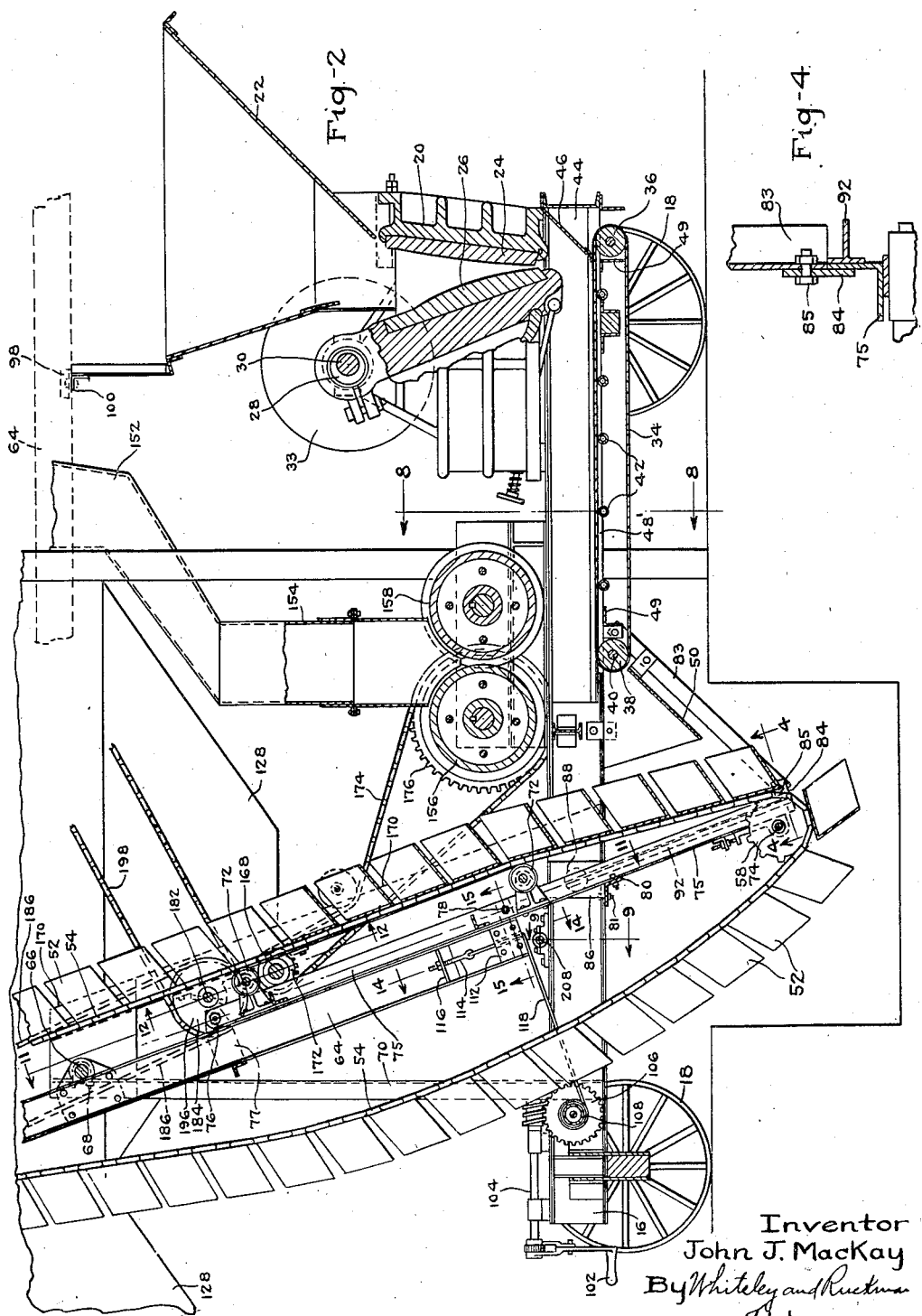

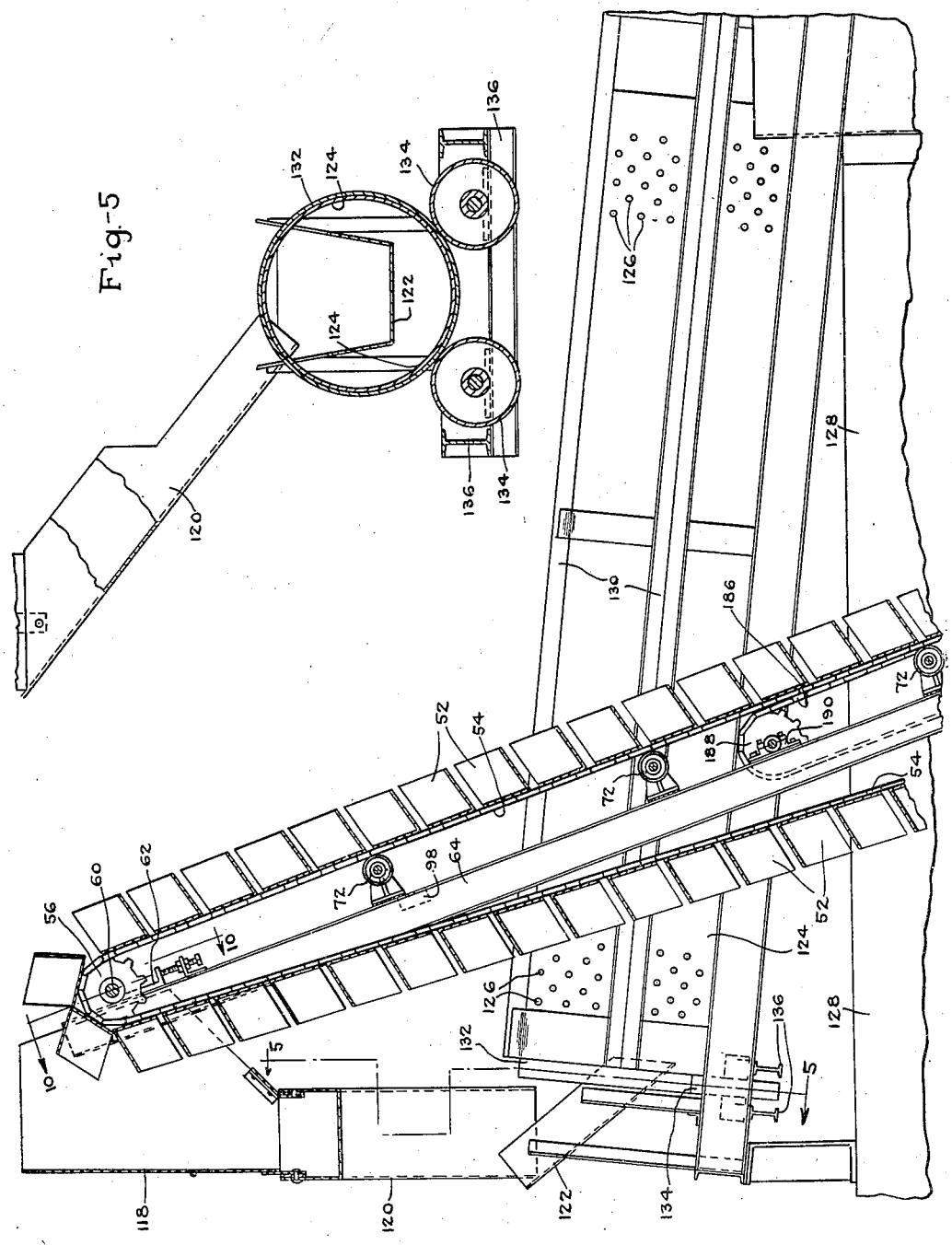

March 13, 1934.     J. J. MacKAY     1,950,501
ROCK CRUSHING PLANT
Filed May 16, 1931     9 Sheets-Sheet 4
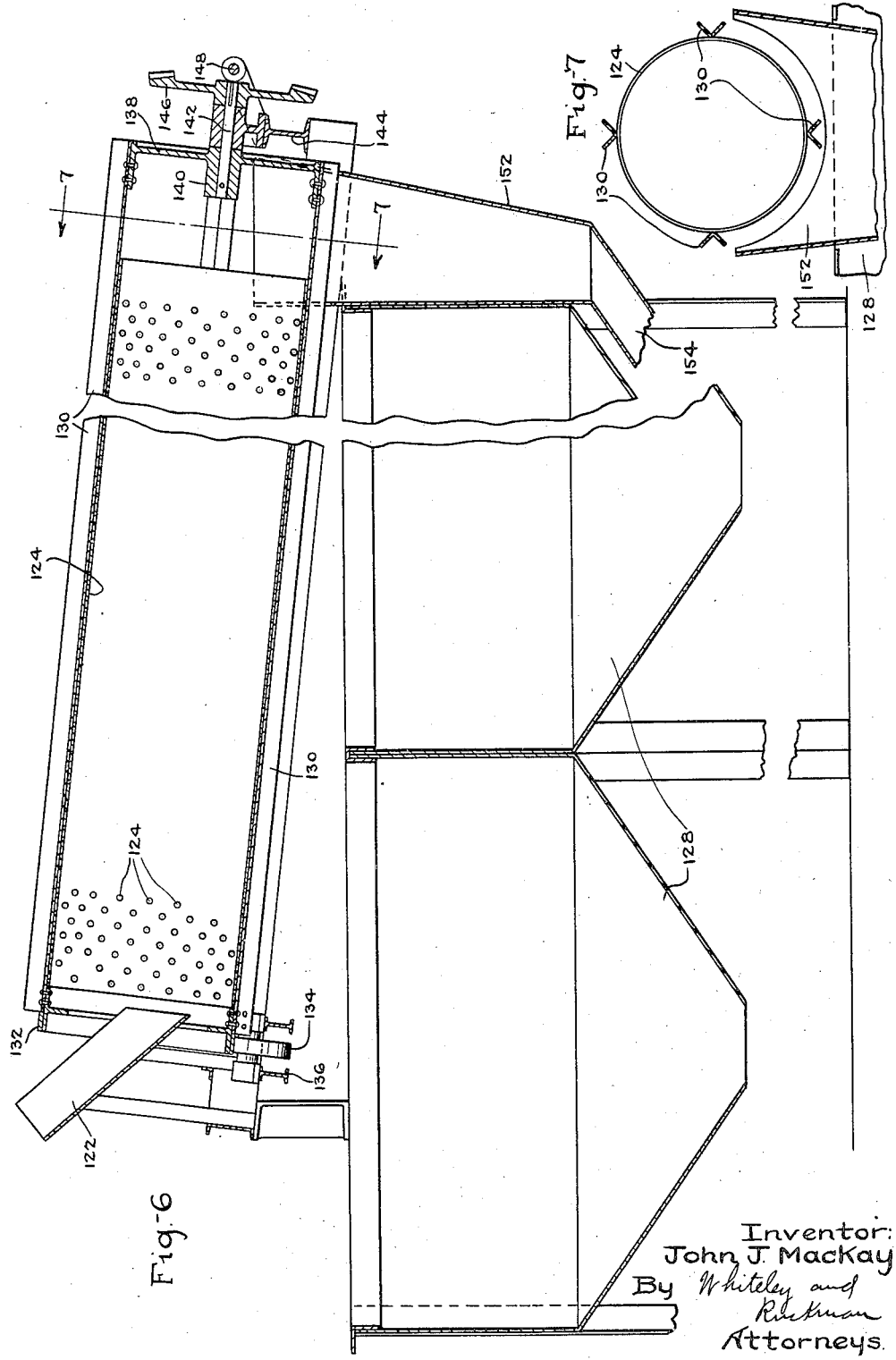
Inventor:
John J. MacKay
By Whiteley and Rickman
Attorneys.

March 13, 1934.   J. J. MacKAY   1,950,501
ROCK CRUSHING PLANT
Filed May 16, 1931   9 Sheets-Sheet 6

Inventor:
John J. MacKay
By Whiteley and Rickman
Attorneys

March 13, 1934.　　　J. J. MacKAY　　　1,950,501
ROCK CRUSHING PLANT
Filed May 16, 1931　　　9 Sheets-Sheet 7

Inventor
John J. MacKay.
By Whiteley and Ruckman
Attorneys.

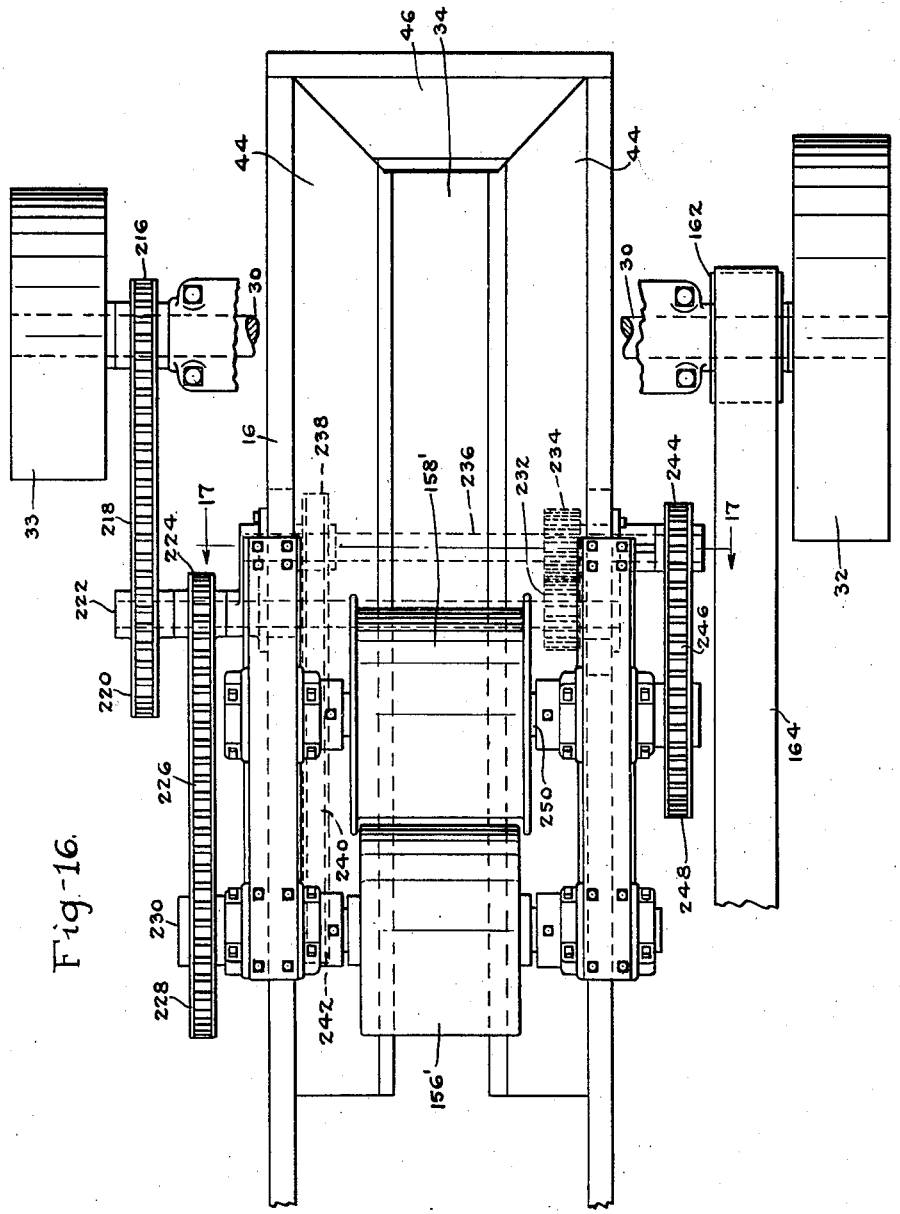

March 13, 1934.  J. J. MacKAY  1,950,501
ROCK CRUSHING PLANT
Filed May 16, 1931  9 Sheets-Sheet 9
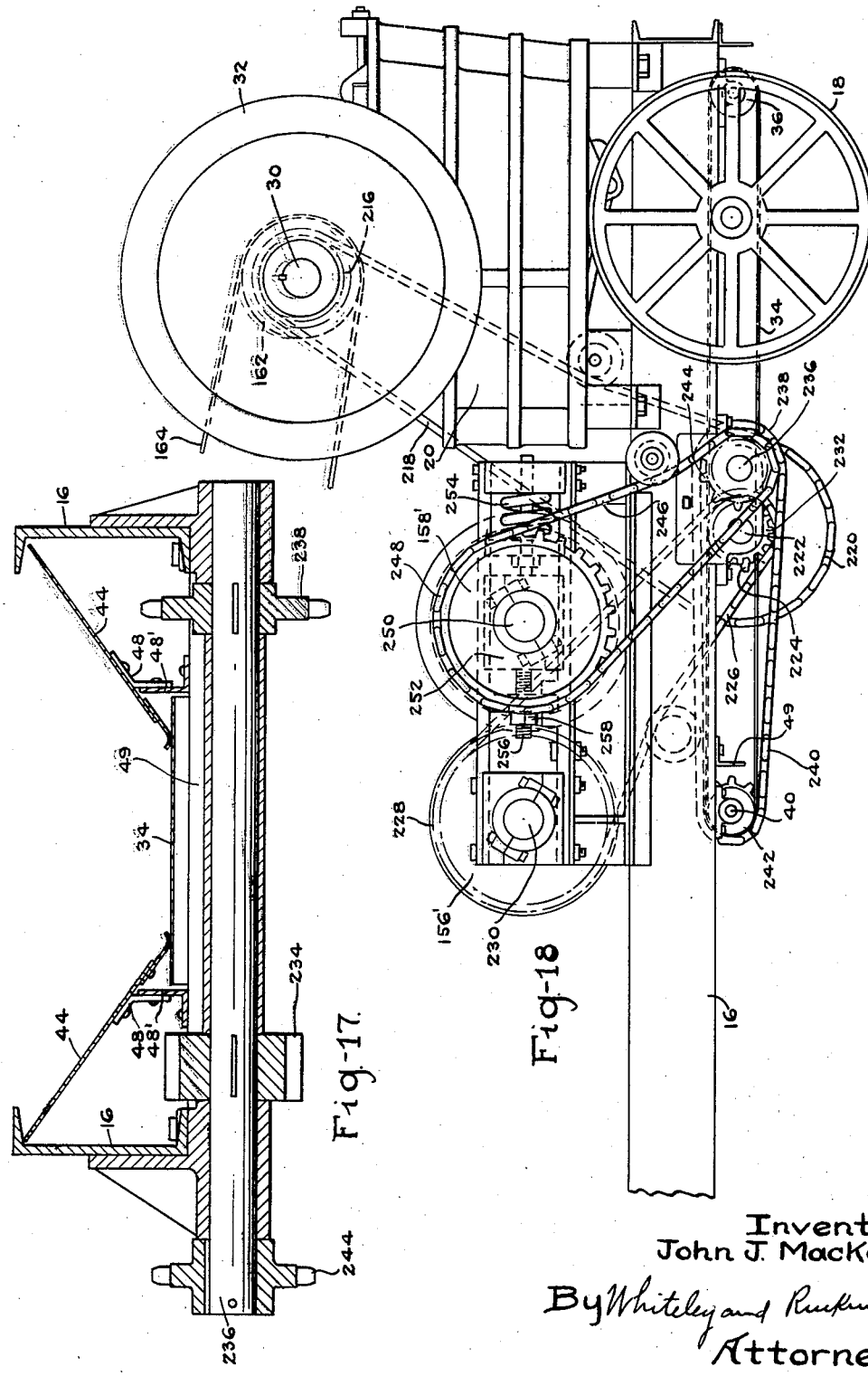
Inventor:
John J. MacKay.
By Whiteley and Ruckman
Attorneys.

Patented Mar. 13, 1934

1,950,501

UNITED STATES PATENT OFFICE 1,950,501

ROCK CRUSHING PLANT

John J. MacKay, Minneapolis, Minn., assignor to Diamond Iron Works, Inc., Minneapolis, Minn.

Application May 16, 1931, Serial No. 537,779

3 Claims. (Cl. 83—53)

My invention relates to rock crushing plants and more particularly to apparatus of this character which is so constructed and arranged that it may be readily transported from place to place to take care of construction work located at widely separated places as in road construction work. The term "rock crushing" is used in a broad sense and is intended to designate a plant capable of crushing in addition to rock and stones used in construction work, other material such as ore, for instance. Among the objects of the invention are the provision of a plant which has great rock crushing capacity and which will deliver the crushed rock free from over-size pieces. In the operation of my improved plant, the rock to be crushed is delivered from trucks or other suitable source of supply into a hopper of large size which feeds directly into a jaw-crusher. From the jaw-crusher, the rock is discharged upon a conveyor belt leading to a bucket conveyor by means of which it is elevated to a rotary screen which discharges the properly reduced pieces to a suitable place such as a jack-leg bin, provision being made for feeding the over-size pieces to a roll-crusher which in turn delivers the recrushed pieces to the conveyor belt to be re-screened.

The full objects and advantages of my invention will appear in connection with the detailed description thereof, and the novel features of my inventive idea will be particularly pointed out in the claims.

In the accompanying drawings which illustrate a practical embodiment of my invention,—

Figure 1:
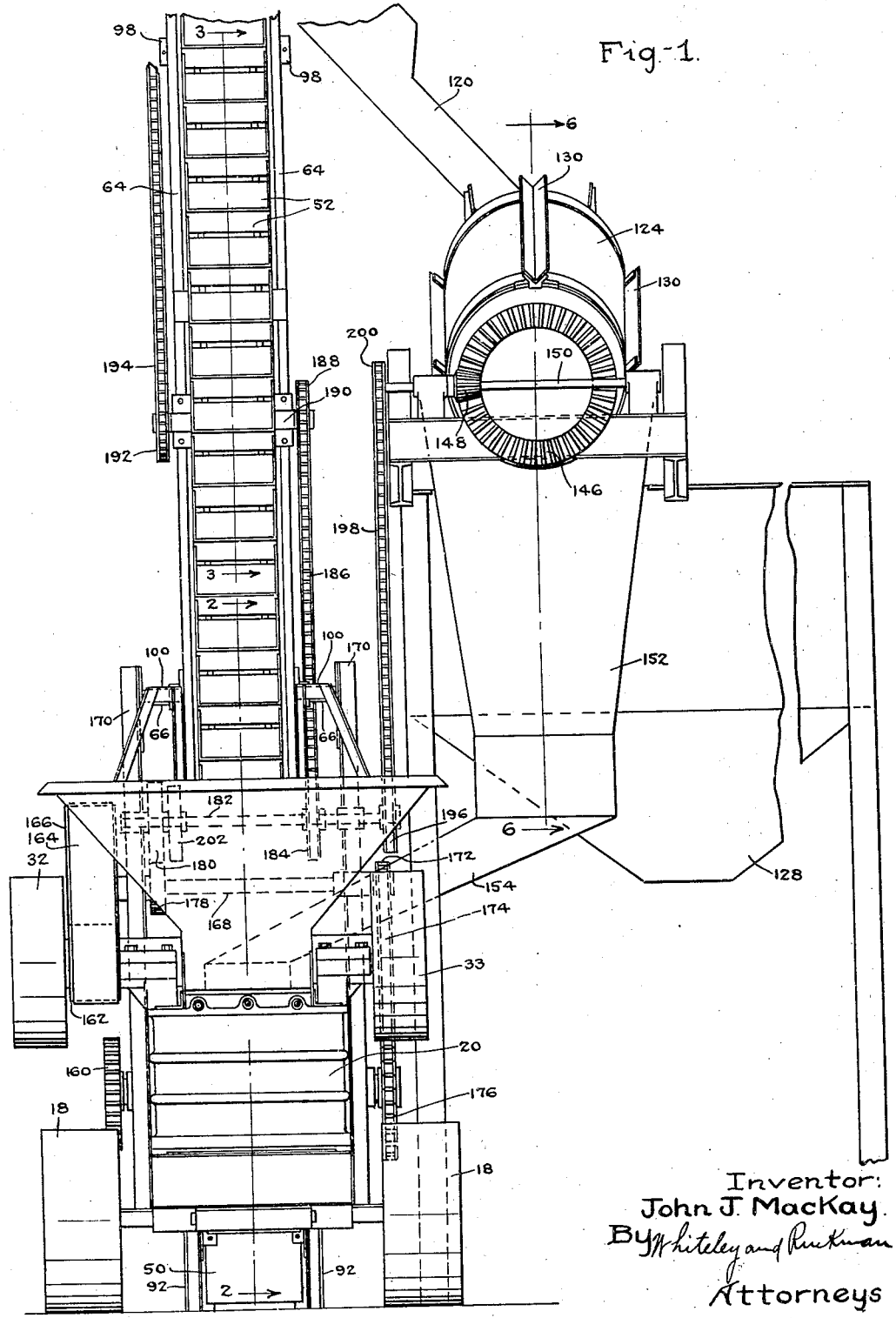
Figure 8:
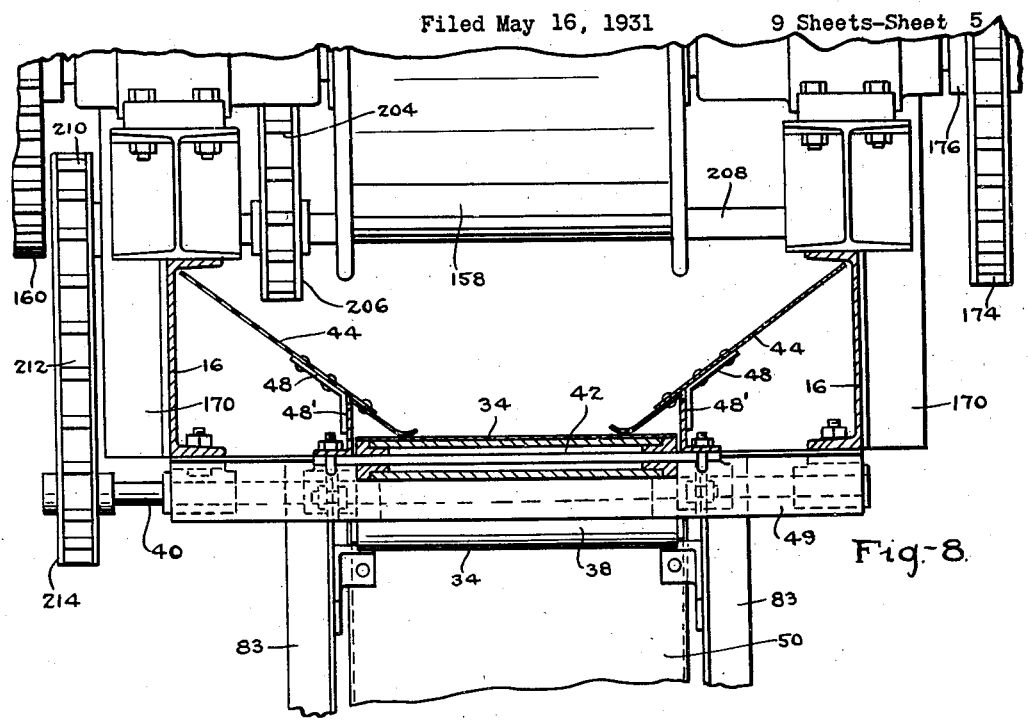
Figure 9:
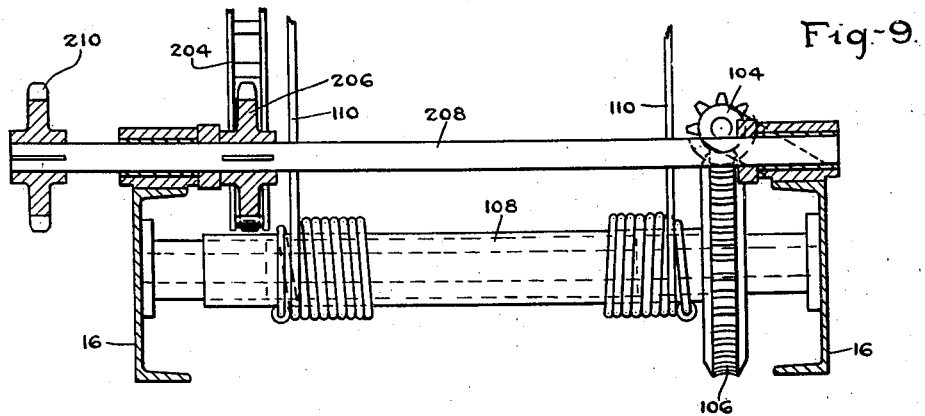
Figure 10:
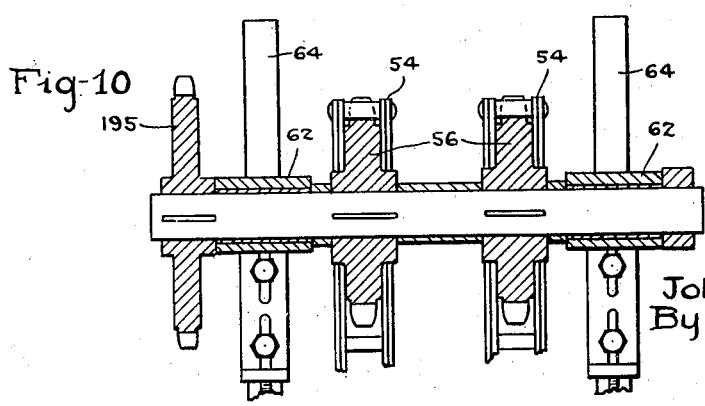
Figure 11:
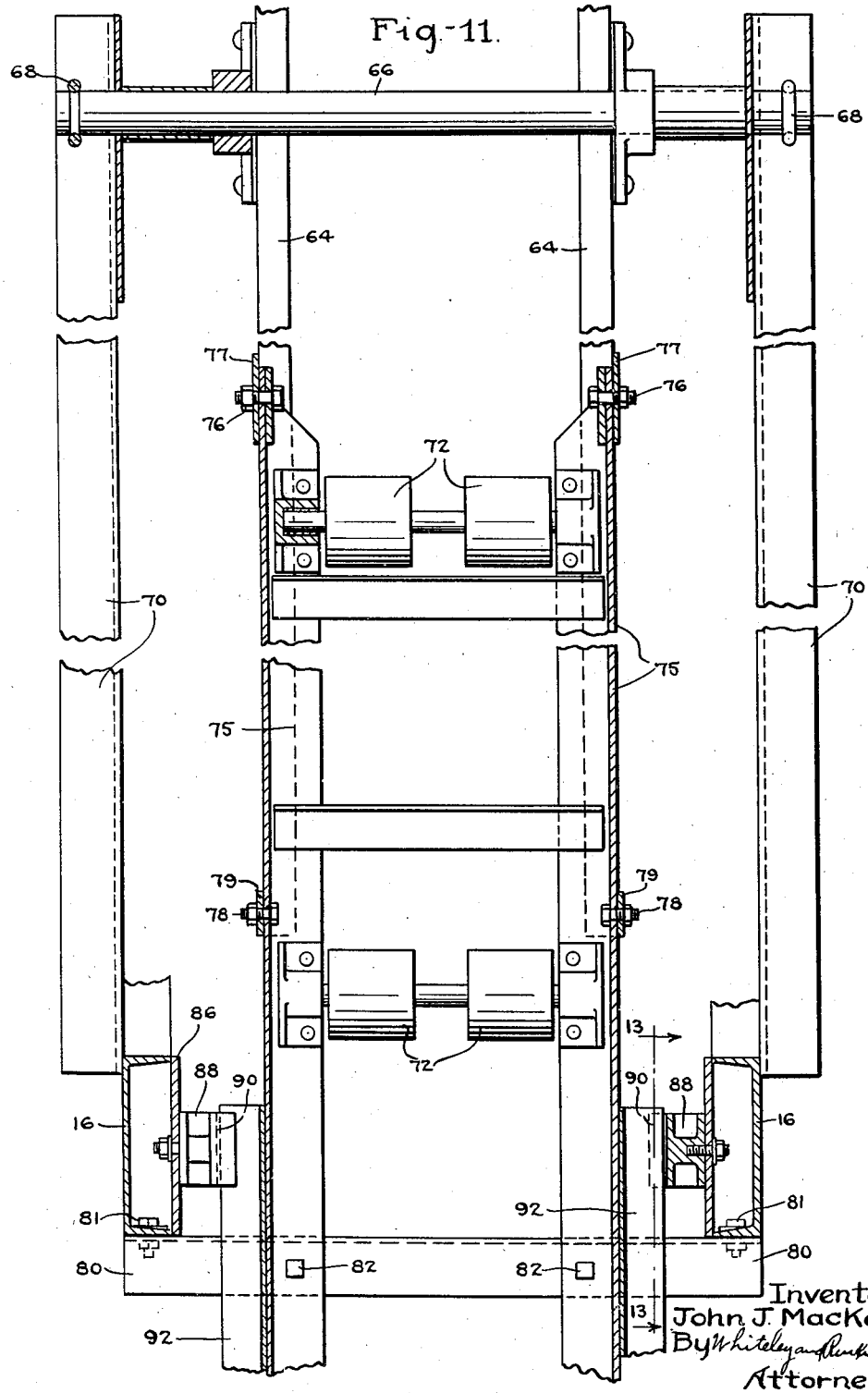
Figure 12:
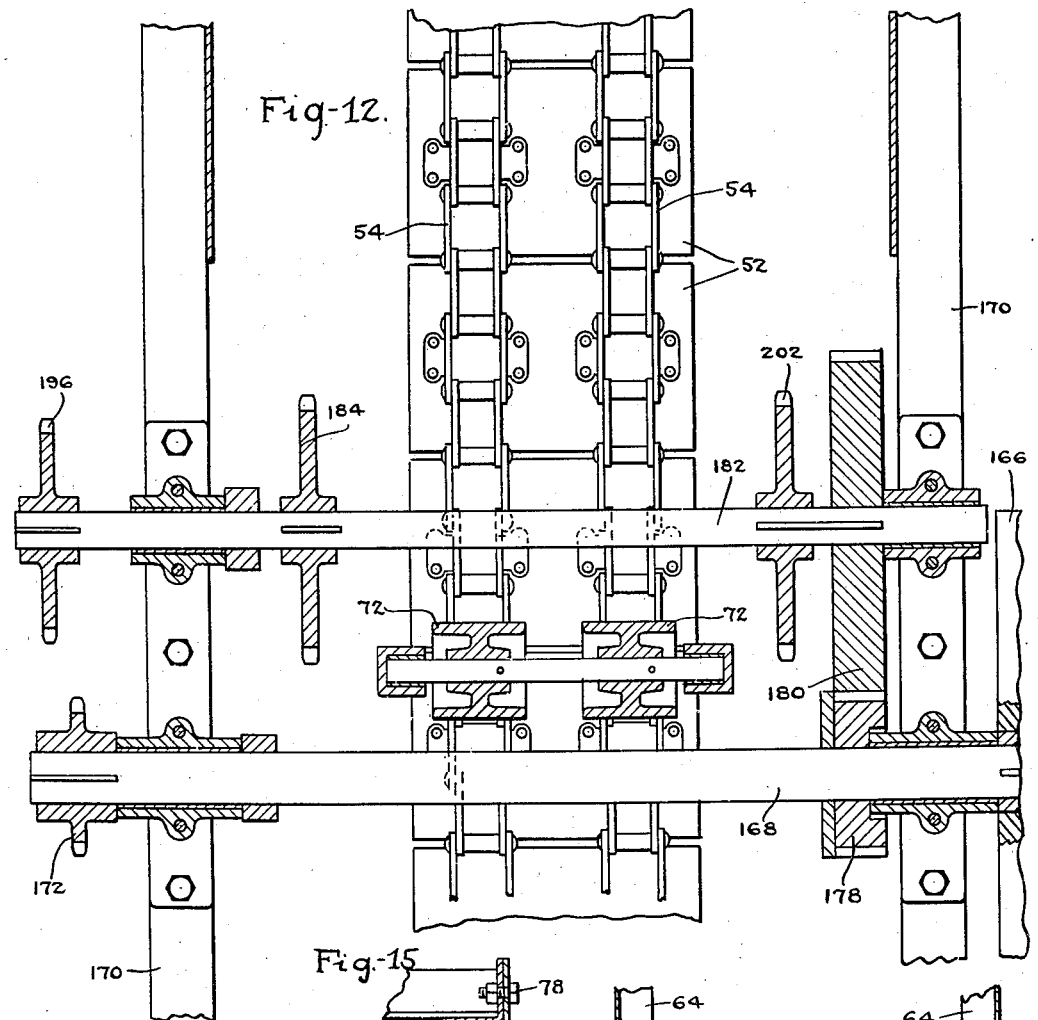
Figure 15:
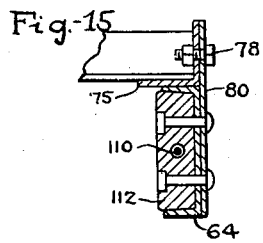
Figure 13:
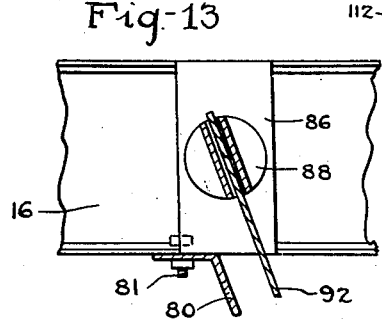
Figure 14:
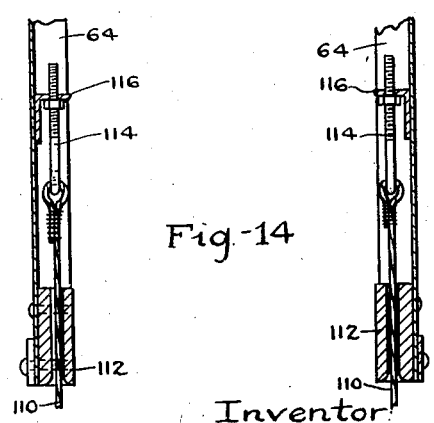

Fig. 1 is a rear elevational view of the machine. Fig. 2 is a view of the lower portion of the machine taken in section on the line 2—2 of Fig. 1. Fig. 3 is a view of the upper portion of the machine taken in section on the line 3—3 of Fig. 1. Fig. 4 (Sheet 2) is a detail view on an enlarged scale in section on the line 4—4 of Fig. 2. Fig. 5 (Sheet 3) is a view in section on the line 5—5 of Fig. 3. Fig. 6 (Sheet 4) is a view in section on the line 6—6 of Fig. 1. Fig. 7 is a view in section on the line 7—7 of Fig. 6. Fig. 8 (Sheet 5) is a view on an enlarged scale in section on the line 8—8 of Fig. 2. Fig. 9 is a view on an enlarged scale in section on the line 9—9 of Fig. 2. Fig. 10 is a view on an enlarged scale in section on the line 10—10 of Fig. 3 showing an elevator chain with buckets removed therefrom. Fig. 11 (Sheet 6) is a view on an enlarged scale in section on the line 11—11 of Fig. 2. Fig. 12 (Sheet 7) is a view on an enlarged scale mostly in section on the line 12—12 of Fig. 2. Fig. 13 is a view in section on the line 13—13 of Fig. 11. Fig. 14 is a view in section on the line 14—14 of Fig. 2. Fig. 15 is a view in section on the line 15—15 of Fig. 2. Fig. 16 is a top plan view showing a modified form of device. Fig. 17 is a view in section on the line 17—17 of Fig. 16. Fig. 18 is a side elevational view showing the modified form of device.

Referring to the construction shown in the drawings, the numeral 16 designates the main frame of the machine which is mounted on wheels 18 in order that the machine may be readily transported. As best shown in Fig. 2, the frame 16 carries a support 20 upon which is mounted a hopper 22 adapted to be supplied in any suitable manner with the material to be crushed. The support 20 carries a jaw-crusher positioned underneath the hopper and consisting of a fixed jaw 24 and a rocking jaw 26, the latter being oscillated by eccentrics 28 secured to a shaft 30, one end of which is provided with a pulley 32 driven from any suitable source of power and the other end of which is provided with a fly wheel 33. The material crushed between the jaws 24 and 26 falls upon an endless belt conveyor 34 trained over rollers 36 and 38, the shaft 40 of the latter roller being driven in a manner which will be referred to later. The upper stretch of the conveyor 34 is supported by rollers 42 and as shown in Fig. 8 inclined side plates 44 retain the crushed material upon the conveyor belt while an inclined plate 46 as shown in Fig. 2 closes the space at the rear end of the belt. The plates 44 are inclined downwardly and inwardly from the upper flanges of the flanged frame members 16 and are supported by brackets 48 carried by longitudinal bars 48' secured to transverse members 49. The delivery end of the conveyor 34 as shown in Fig. 2 discharges upon a chute 50 which delivers the crushed material to a bucket elevator consisting of a series of buckets 52 attached to endless sprocket chains 54 which are trained over upper sprocket wheels 56 and lower sprocket wheels 58. The upper sprocket wheels 56 are secured to a shaft 60 rotatably mounted in bearings 62 adjustably secured to channel members 64 of a frame work pivotally mounted on a rod 66 secured by U-bolts 68 to inclined supports 70 extending up from the main frame 16 as will be understood from Figs. 2 and 11. It will be understood from Figs. 2 and 3 that the bucket elevator when in use occupies the somewhat inclined position shown and that the right hand portion of the elevator travels upwardly and is backed up by rollers 72. It will be understood from Fig. 2 that the lower end of the elevator when in use extends down into a depression D formed in the ground upon which the machine rests as shown in Fig. 2. The lower sprocket wheels 58 are secured to a shaft 74 mounted in the bearings carried by the lower ends of frame members 75 whose upper portions overlap the lower portions of the frame members 64 and at their upper ends are pivoted to the members 64 by pivot bolts 76 passing through the members 75 and through projections 77 carried by the members 64 as will be understood from Figs. 2 and 11. When the two part elevator frame constituted by the members 64 and 75 is in its operative position shown in Figs. 2 and 3, the members 64 and 75 are held in alinement with each other by bolts 78 passing through the members 75 and through projections 79 carried by the member 64 as will be understood from Fig. 11. The members of the elevator frame are held in their operative position inclined forwardly by means of an angle plate 80 secured to the main frame members 16 by bolts 81, the members 75 being secured by bolts 82 to the plate 80 as shown in Fig. 11. The members 75 are secured at the bottom by means of inclined bars 83 whose lower ends are fastened to projections 84 on the members 75 by means of bolts 85 as shown in Fig. 4. Referring to Figs. 11 and 13, it will be understood that plates 86 are welded to the flanges of the main frame members 16 and that these plates rotatably support guides 88 having disklike heads. These heads are provided with diametral slots 90 which slidably receive the flanges of two bars 92 welded to the outer sides of the members 75. As shown in Fig. 1, the side members 64 carry projections 98 which when the elevator is tipped back around the rod 66 into folded position, rest upon supports 100 extending up from the hopper 22 as shown in Fig. 2. In order to thus swing the elevator frame into folded position, it is necessary to remove the bolts 78 and 82 as will be understood from Fig. 11 and to remove the bolts 85 as will be understood from Fig. 4. The elevator frame members 64 may then be swung backwardly around the rod 66 as will be understood from Fig. 2. It should be recalled that the elevator frame members 75 are attached to the members 64 by pivot bolts 78. Therefore, when the members 64 are swung, the members 75 are caused to rise and bring the lower end of the elevator up out of the depression D, the bars 92 sliding upwardly in the grooves of the guides 88 as will be understood from Fig. 11.

In order to swing the elevator frame, the following mechanism is provided. As shown in Fig. 2, a ratchet crank handle 102 is secured to the forward end of a shaft 104 mounted in bearings carried by the main frame 16. The rear end of this shaft is provided with a worm 105 meshing with a worm wheel 106 secured to a winding drum 108 mounted in bearings carried by the main frame 16 as shown in Fig. 9. The outer ends of a pair of cables 110 are secured to the drum 108 so that by turning the handle 102 in the proper direction, the cables are wound on the drum. The other ends of the cables 110 pass through blocks 112 carried by the side members 64 and are secured to eye-bolts 114 carried by brackets 116 secured to the side members 64 as best shown in Fig. 14. By turning the crank handle 102 in the proper direction, the elevator is moved from its normally inclined position into a vertical position. Upon then throwing a rope over the upper end of the elevator it may be pulled over so that projections 98 carried thereby rest upon supports 100 extending up from the hopper 22. The elevator may be raised into operative position by turning the crank handle 102 so as to bring the elevator into vertical position and then by means of a rope the elevator may be pulled over into its inclined position and secured by the bolts which were previously removed to permit folding.

The buckets 52 when they arrive at the upper end of the elevator frame discharge into a hopper 118 from the lower end of which a chute 120 leads into another chute 122 as will be understood from Figs. 1, 3, 5, and 6. As best shown in the latter figure, the lower end of the chute 122 extends into the open upper end of a rotary inclined screen 124. This screen is known as a "scalping" screen, and contains a multiplicity of apertures 126 through which material which has been crushed to the desired size is delivered into jack-leg hoppers or bins 128 which may be provided with discharge gates for delivering into trucks or other suitable place of delivery. The screen 124 is made of sheet material to which are secured longitudinal exterior angle bars 130 preferably spaced at a 90° relationship to each other. As will be noted from Fig. 6, the angle bars 124 stop short of the upper end of the screen 124 and extend beyond the lower end of this screen. The upper end of the screen is provided with a tire 132 which rests upon rollers 134 having trunnions rotatably mounted in bearings carried by a support 136. A disk 138 has its periphery secured to the projecting ends of the bars 130 and this disk has a central hub 140 which is secured to a stub shaft 142 rotatable in a bearing carried by a support 144. A bevel gear 146 secured to the outer end of the shaft 142 meshes with a bevel gear 148 secured to a shaft 150 driven in a manner which will be referred to later in connection with Fig. 1. It will be noted from Fig. 6, that the lower end of the screen inside of the disk or head 138 is open except for the bars 130. The opening thus produced provides for discharge into the upper end of a hopper 152 from the lower end of which a chute 154 leads to the space between a pair of crushing rolls 156 and 158 as best shown in Fig. 2. These rolls are geared together by gears 160 as will be understood from Figs. 1 and 8. The material which is too large to pass through the perforations of the screen 124 is therefore delivered to the rolls 156 and 158 for further crushing and the recrushed material drops upon the delivery end of the conveyor 34 and upon the chute 50 for delivery again to the buckets 52 by which it is carried up for re-screening.

The manner in which the various parts of the crushing machine are driven will now be described. The power shaft 30 operates the movable crushing jaw 26. As will be understood from Fig. 1, a pulley 162 is secured to the shaft 30 and a belt 164 runs around this pulley and around a pulley 166 secured to one end of a shaft 168 mounted in bearings carried by supports 170 as shown in Fig. 12. The other end of the shaft 168 has secured thereto a sprocket wheel 172, it being understood from Fig. 2 that a sprocket chain 174 is trained around this sprocket wheel and around a sprocket wheel 176 secured to the shaft of the crushing roll 156. As best shown in Fig. 12, a gear 178 secured to the shaft 168 meshes with a gear 180 secured to a shaft 182 mounted in bearings carried by the supports 170. A sprocket wheel 184 secured to the shaft 182 is connected by a sprocket chain 186 with a sprocket wheel 188 secured to one end of a shaft 190 mounted in bearings carried by the elevator frame members 64. A sprocket 192 secured to the shaft 190 is connected by a sprocket chain 194 with a sprocket wheel 195 secured to the upper elevator shaft 60 as shown in Fig. 10 whereby the buckets of the elevator are driven. A sprocket wheel 196 secured to the shaft 182 is connected by a sprocket chain 198 with a sprocket wheel 200 secured to the shaft 150 which drives the screen as best shown in Fig. 1. A sprocket wheel 202 secured to the shaft 182 is connected by a sprocket chain 204 with a sprocket wheel 206 secured to a shaft 208 as shown in Fig. 9. Another sprocket wheel 210 secured to the shaft 208 is connected by a sprocket chain 212 to a sprocket wheel 214 secured to the shaft 40 which drives the conveyor belt 34 as will be understood from Fig. 8.

In the modified form of drive construction shown in Figs. 16, 17 and 18, the crushing rolls instead of being geared together, are driven separately so as to be capable of greater adjustment or relative movement toward and away from each other. In this modified form, the crushing rolls are designated as 156' and 158'. As shown in Figs. 16 and 18, the driving shaft 30 has secured thereto a sprocket wheel 216. A sprocket chain 218 is trained around this sprocket wheel and around a sprocket wheel 220 secured to one end of a shaft 222. Adjacent the sprocket wheel 220, a sprocket wheel 224 is secured to the shaft 222. A sprocket chain 226 is trained around the sprocket wheel 224 and the sprocket wheel 228 which is secured to the shaft 230 of the crushing roll 153'. Secured to the other end of the shaft 222, there is a gear 232 which meshes with a gear 234 secured to a shaft 236. Secured to an end of this latter shaft, there is a sprocket wheel 238 which drives a sprocket chain 240 and a sprocket wheel 242 secured to the shaft 40 of the roller 38 previously referred to whereby the conveyor 34 is driven. Secured to the other end of the shaft 236 is a sprocket wheel 244. A sprocket chain 246 is trained around the sprocket wheel 244 and around a sprocket wheel 248 secured to the shaft 250 of the crushing roll 158'. Since the crushing rolls 156' and 158' are thus independently driven, either or both of them may be arranged for independent adjustment. As shown in Fig. 18, the bearings 252 for the shaft 250 are slidably mounted and backed up by springs 254 to take care of any unusually large pieces of material. By means of screw bolts 256 provided with lock nuts 258, the crushing roll 158' may be adjusted toward and away from the crushing roll 156' so that the rolls will crush the material to the desired size. This construction is obviously more flexible than when the two rolls are geared together by the gears 160 shown in Figs. 1 and 8.

I claim:

1. In a rock-crushing plant, the combination of a wheeled frame, a hopper carried by said frame for receiving the rock to be crushed, a jaw-crusher to which said hopper delivers, an endless horizontally disposed belt conveyor running underneath said jaw crusher, a bucket elevator to which said belt conveyor delivers, means for pivotally mounting said elevator on said wheeled frame to permit said elevator to be folded, detachable means for securing said elevator in operative position with the lower end thereof extending below the surface upon which the wheels of said frame rest, a rotary screen to which said elevator delivers, and a roll crusher to which over-size pieces separated out by said screen are delivered, said roll-crusher delivering to said belt conveyor for re-screening purposes.

2. In a rock-crushing plant, the combination of a wheeled frame, a hopper mounted at the rear of said frame for receiving the rock to be crushed, a jaw-crusher to which said hopper delivers, an endless horizontally disposed belt conveyor running underneath said jaw-crusher, a bucket elevator to which said belt conveyor delivers, means for pivotally mounting said elevator at the front of said frame to fold back upon said hopper, detachable means for securing said elevator in operative position with the lower end thereof extending below the surface upon which the wheels of said frame rest, a rotary screen to which said elevator delivers, and a roll crusher to which over-size pieces separated out by said screen are delivered, said roll-crusher delivering to said belt conveyor for re-screening purposes.

3. In a rock-crushing plant, the combination of a wheeled frame, a jaw crusher mounted at one end of said frame, an endless horizontally disposed belt conveyor supported on said frame and running underneath said jaw crusher, a bucket elevator mounted toward the other end of said frame, the lower end of said elevator when in operative position extending below the surface upon which the wheels of said frame rest, an inclined chute leading downwardly from the delivery end of said belt conveyor to said elevator end the elevator buckets moving upwardly on the side of the elevator adjacent said inclined chute and said chute discharging the material into the rising buckets, a screen to which said elevator delivers, and a roll-crusher to which over-size pieces separated out by said screen are delivered, said roll-crusher being mounted on said frame between said jaw crusher and said elevator and delivering to said belt conveyor for re-screening purposes.

JOHN J. MacKAY.